US012467478B2

(12) United States Patent
Protzeller

(10) Patent No.: US 12,467,478 B2
(45) Date of Patent: Nov. 11, 2025

(54) IMPELLER REMOVAL TOOL

(71) Applicant: BEYTEC, LLC, San Diego, CA (US)

(72) Inventor: Eddie Protzeller, Des Moines, WA (US)

(73) Assignee: BEYTEC, LLC, San Diego, CA (US)

( * ) Notice: Subject to any disclaimer, the term of this patent is extended or adjusted under 35 U.S.C. 154(b) by 0 days.

(21) Appl. No.: 18/969,132

(22) Filed: Dec. 4, 2024

(65) Prior Publication Data

US 2025/0180038 A1 Jun. 5, 2025

Related U.S. Application Data

(60) Provisional application No. 63/606,325, filed on Dec. 5, 2023.

(51) Int. Cl.
*F04D 29/60* (2006.01)
*B23P 19/02* (2006.01)

(52) U.S. Cl.
CPC ............ *F04D 29/60* (2013.01); *B23P 19/025* (2013.01); *Y10T 29/53796* (2015.01)

(58) Field of Classification Search
CPC ........ F04D 29/60; B23P 19/025; B23P 19/04; Y10T 29/53796; Y10T 29/5387; B25B 27/02; B25B 27/023
See application file for complete search history.

(56) References Cited

U.S. PATENT DOCUMENTS 1,888,800 A * 11/1932 Grothe .................. B25B 27/023 29/261
2,136,004 A * 11/1938 Cornwell .............. B25B 27/023 29/261
3,810,294 A * 5/1974 Link ..................... B25B 27/023 29/261
5,341,553 A * 8/1994 Herzhauser ........... B25B 27/023 29/261
5,983,474 A * 11/1999 Koppe .................. B25B 27/023 29/261
10,894,306 B2 * 1/2021 Wang .................... B25B 27/062
11,679,476 B2 6/2023 Chen et al.

OTHER PUBLICATIONS

International Search Report and Written Opinion mailed Feb. 5, 2025, issued in corresponding International Application No. PCT/US2024/058530, filed Dec. 4, 2024, 10 pages.

* cited by examiner

*Primary Examiner* — Lawrence Averick
(74) *Attorney, Agent, or Firm* — Christensen O'Connor Johnson Kindness PLLC

(57) ABSTRACT

An impeller removal tool assembly is provided. The assembly can include a central body, a first puller arm, and a second puller arm, each arm pivotably pinned to the central body and mirrored across a central axis from each other. The puller arms can have angled ramp surfaces and a plurality of teeth projecting toward the central axis. The assembly further includes an arm rotator bolt threadably engaged with the central body and having a bearing configured to contact the angled ramp surfaces, where rotation of the arm rotator bolt causes the puller arms to rotate between a first position disengaged from a hub of an impeller, and a second position engaged with the hub of the impeller. A central rod can extend through the arm rotator bolt and translate along the axis with respect to the central body and the arm rotator bolt to interface with a pump shaft.

9 Claims, 8 Drawing Sheets

IMPELLER REMOVAL TOOL

BACKGROUND

Water pumps are critical components in various machinery, responsible for circulating liquid to maintain optimal temperatures within a system coupled to the water pump. In watercraft and other applications, rubber impellers can be used in the water pumps to circulate water or coolant through the watercraft systems (e.g., engines, exhaust, transmissions, and/or other systems). Routine maintenance tasks, such as impeller replacement, are essential for the reliable operation and longevity of the systems cooled by water pumps.

Impellers are typically press-fit to a pump shaft and have a keyed coupling to prevent the impeller from slipping with respect to the pump shaft during use. Replacement of the impeller requires removal from the pump shaft by pulling the impeller off of the pump shaft. Traditional impeller pullers utilized in various industries (e.g., the marine industry) typically consist of metal tools with prongs or arms that engage the impeller during removal. While effective in some instances, these conventional pullers often pose the risk of damaging the shaft of the water pump or slipping with respect to the impeller during extraction. The rigidity of metal pullers, combined with the force required for removal, may result in tears or cracks in the impeller rubber, resulting in difficulty in removal of the impeller.

Conventional impeller removal tools may also lack versatility, making them incompatible with certain impeller designs or challenging to use in confined engine spaces. In one example, marine service personnel (engineers, mechanics, etc.) often require a wide variety of impeller puller types and sizes to address differing impeller installation configurations. Inaccessible impeller locations, especially in compact marine engine compartments, can impede the efficient application of conventional pullers, leading to time-consuming and labor-intensive maintenance procedures.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1A:
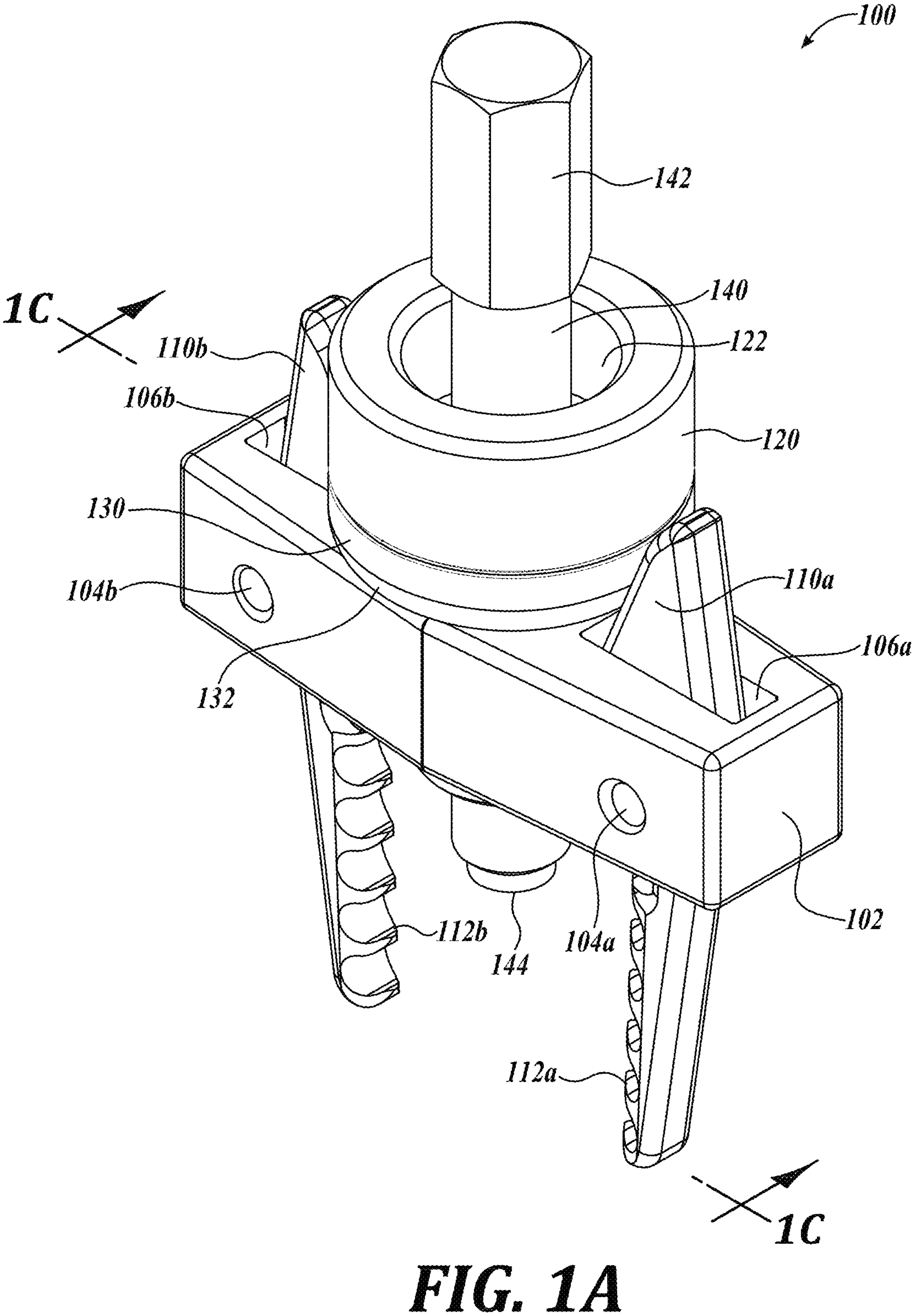
FIGS. 1A and 1B are perspective and front views of an impeller removal tool assembly, in accordance with embodiments of the present disclosure.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

As will be described in more detail below, the present disclosure provides embodiments of an impeller removal tool assembly ("impeller puller") that can be used to remove a press-fit impeller from a water pump shaft. Embodiments of the present disclosure are described herein with application examples related to the field of marine water pump maintenance and, more specifically, to an improved rubber impeller puller designed for efficient removal of rubber impellers from marine water pump assemblies. Embodiments disclosed herein address the challenges associated with existing impeller pullers, offering an enhanced solution that improves ease of use, minimizes potential damage to the pump shaft, water pump housing, and/or other components, and enhances overall efficiency in the maintenance process.

Although embodiments of the present disclosure may be described with reference to rubber impeller pullers for water pumps suitable for marine cooling systems, one skilled in the relevant art will appreciate that the disclosed embodiments are illustrative in nature and therefore should not be construed as limited to such an application. It should therefore be apparent that the disclosed technologies and methodologies have wide application, and therefore may be suitable for use with many types of water pumps, including different types of land, air, or marine vehicles, various engines, generators, and other equipment, and the like. As used herein, the term "water pump" is intended to include pumps configured to impart flow in any fluid or fluid mixture utilizing impellers with flexible vanes. In this regard, the impeller pullers of the present disclosure are suitable for use with impellers from pumps for cooling fluids (e.g., water, glycol-based coolant, water mixtures, etc.), high- and low-temperature fluids, viscous fluids (e.g., oils), delicate fluids, and/or slurry fluids having solid content. Such pumps are typically used in the oenological, food processing, chemical, cosmetic, and marine fields, and are applicable to the embodiments disclosed herein. Accordingly, the following descriptions and illustrations herein applying the embodiments to water pumps of marine cooling systems should not limit the scope of the claimed subject matter thereto.

The present disclosure provides examples of an impeller puller for removing water pump impellers press-fit onto pump shafts. Many water pumps are flexible vane pump assemblies having flexible material impellers made from, for example, natural rubber, synthetic rubber polymer (such as neoprene, nitrile, ethylene propylene diene monomer, etc.), silicone, etc. These flexible material impellers can be used in the water pump used to move fluid through a water pump by deforming (bending motion) of the flexible vanes. The flexibility of the vanes enables a tight seal to the internal housing, making the pump self-priming, while also permitting bi-directional operation. In these types of water pumps, the rubber impeller is driven by a pump shaft connected to a power source, such as a motor or mechanical power takeoff from the engine or transmission. The impeller can be connected to the pump shaft by friction in a press-fit coupling, with rotational torque of the pump shaft transferred by the friction fit and mechanically reinforced by interleaved splines or a key way feature.

Flexible vane impellers are typically constructed with a hub having the same material as the impeller vanes (e.g., rubber), and can include a reinforcing central cylinder, covered on the outwardly facing surface by the flexible material, to provide structure at the interface with the pump shaft. In the embodiments of the present disclosure, the puller includes arms having inwardly projecting teeth configured to grip against and/or pierce into the flexible material of the hub to provide a mechanical coupling to transfer the pulling forces to the impeller with respect to the pump shaft, urging the impeller hub off of the pump shaft. The puller can include a mechanical tightening system for the arms to provide increased mechanical leverage, the system having adjustable leverage strength by varying the bearing angle and/or thread pitch.

During maintenance of water pump systems, the replacement of the flexible impeller can be difficult due to typically confined spaces where the pump has been installed and the necessity of removing the impeller without damaging the shaft or housing of the water pump. Flexible impellers having larger diameters can often have a longer hub length, corresponding to greater surface area in contact with the shaft of the water pump. This relatively large surface area and other considerations (e.g., corrosion on the components) can increase the required force to remove the impeller from housing. To prevent binding, the impellers must be pulled off the pump shaft axially, as a skew in the removal can cause the impeller to become stuck on the shaft. Embodiments of the present disclosure are expected to address these and other needs in impeller removal tools.

The impeller pullers described herein can have arms having an angled surface configured to interface with an arm rotator bolt that allows a leveraged pressure of the arms on the impeller hub with a relatively low corresponding torque applied to the arm rotator bolt. As will be described below, with this leverage, a user of the impeller puller is able to generate a clamping force on hub of the impeller with a mechanical advantage. In some embodiments, the impeller puller can include a bearing surface to transfer the mechanical load to the angled surfaces while tightening the arm rotator bolt of the system, rather than having the rotating arm rotator bolt directly interface across the angled surfaces. The arms of the impeller puller include one or more teeth configured to pierce into the flexible material (e.g., rubber) of the hub of the impeller. As the mechanical load is applied through the arm rotator bolt into the arms, the teeth clamp inward toward the hub of the impeller. In this regard, as the arm rotator bolt is tightened, the arms rotate toward the impeller hub to engage the teeth into the flexible material. In some embodiments, the teeth have a profile that increases the grip with the flexible material as the axial force is applied to the impeller to remove it from the pump shaft. The configuration of the embodiments described herein allows removal of the impeller from the pump shaft by engagement of the teeth into the flexible material of the impeller hub.

In the disclosed embodiments, the arms can have any length, size, or profile. Although only two opposing arms are shown in the FIGURES, the impeller pullers of the present disclosure can be configured to have more than two arms, e.g., three arms, four arms, etc. The impeller pullers can be scaled in size and can be manufactured any suitable material, such as metal, composite, or a combination thereof. In some embodiments, the arm rotator bolt can include flats to use an external tool for mechanical leverage, such as a wrench. The angle and profile of the teeth, their spacing, and the number of teeth can vary depending on application configuration. In some embodiments, the bearing size and interfacing surface can be any shape to transmit rotation to the arms when tightening the arm rotator bolt.

Figure 1B:
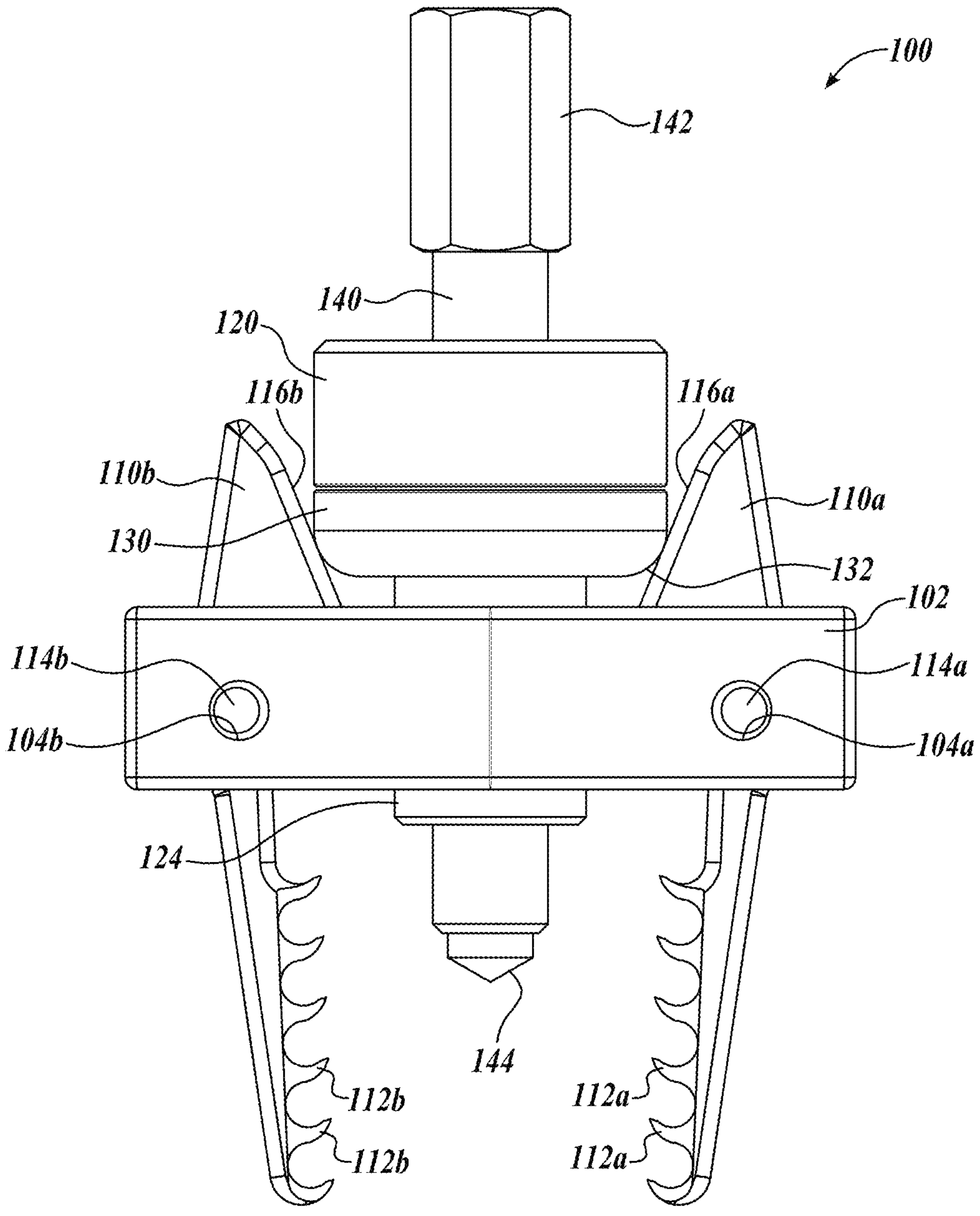

FIGS. 1A and 1B are perspective and front views of an impeller removal tool assembly 100 (hereinafter "assembly 100"), in accordance with embodiments of the present disclosure. The assembly 100 includes a central body 102 having a first arm pivot aperture 104*a*, a second arm pivot aperture 104*b*, a first arm pivot slot 106*a*, and a second arm pivot slot 106*b*. The central body 102 can be formed from a single piece or multiple pieces assembled together to provide structural arrangement between the components of the assembly 100. The assembly 100 further includes a first puller arm 110*a* and a second puller arm 110*b*, each having an upper portion extending upward from the central body 102 and a lower portion extending downward from the central body 102. The first and second puller arms 110*a* and 110*b* can each have a plurality of first and second teeth 112*a* and 112*b*, respectively, on the lower portions of the arms, where the pluralities of first and second teeth 112*a* and 112*b* are configured to interface with the flexible material of an impeller hub (see, e.g., FIGS. 2A-2C). As shown, the pluralities of first and second teeth 112*a* and 112*b* can include features configured to grip the flexible material of the impeller hub, such as an upward curve as shown in the FIGURES. The first and second puller arms 110*a* and 110*b* can be pivotably pinned to the central body 102 with first and second pins 114*a* and 114*b*, respectively. In this regard, the first and second puller arms 110*a* and 110*b* are free to rotate within the first and second arm pivot slots 106*a* and 106*b*.

The assembly 100 can further include an arm rotator bolt 120 configured to threadably engage an aperture of the central body 102 in a coaxial configuration, such that arm rotator bolt 120 moves axially with respect to the central body 102 when rotated within the central body 102. As shown in FIG. 1A, the arm rotator bolt 120 can include a bowl portion 122 that provide clearance for a tool, e.g., a socket wrench, when removing the impeller with the assembly 100. The arm rotator bolt 120 can include a threaded shank 124 of the arm rotator bolt 120 that is configured to interface with the central body 102.

As the arm rotator bolt 120 moves axially with respect to the central body 102, engagement with the first and second puller arms 110*a* and 110*b* causes the arms to rotate about the first and second pins 114*a* and 114*b*. The interface between the arm rotator bolt 120 and the first and second puller arms 110*a* and 110*b* can be separated by a bearing 130 positioned therebetween. The bearing 130 can have an arm interface surface 132 (e.g., as shown in the illustrated embodiment, a rounded surface), that interfaces with first and second angled ramp surfaces 116*a* and 116*b* on the upper portions of the first and second puller arms 110*a* and 110*b*, respectively, as the arm rotator bolt 120 moves axially with respect to the central body 102. The angled ramp surfaces 116*a* and 116*b* can be arranged at any angle or a compound angle, with a steeper angle (closer to vertical in the orientation shown in FIG. 1B) providing a greater mechanical leverage with respect to the pivot of the first and second puller arms 110*a* and 110*b* with slower arm rotation based on rotation of the arm rotator bolt 120, and a shallower angle (away from vertical in the orientation shown in FIG. 1B) providing a lower mechanical leverage with respect to the pivot of the first and second puller arms 110*a* and 110*b* with quicker arm rotation based on rotation of the arm rotator bolt 120. In the illustrated embodiments, the angled ramp surfaces 116*a* and 116*b* have a compound angle with portions having a shallower angle to quickly rotate the first and second puller arms 110a and 110b into position to contact the impeller hub, and portions having a steeper angle to provide greater mechanical leverage once the arms are in position closer to the impeller hub.

Embodiments of the present disclosure can have any configuration of the angled ramp surfaces 116a and 116b. Accordingly, different size and material of impellers, or related tooth profile of the first and second puller arms 110a and 110b can require different ramp angles of the angled ramp surfaces 116a and 116b. In this regard, tougher impeller materials and/or more dull tooth profiles may require a steeper angle to provide greater mechanical leverage to engage the teeth with the impeller hub. Relatedly, softer impeller materials and/or sharper tooth profiles may benefit from a shallower angle to prevent the teeth from piercing too deep into the material, potentially impacting the enclosed impeller hub cylinder and/or the pump shaft. The illustrated embodiment of the teeth 112a and 112b shown in FIGS. 1A-2C have a profile such that the teeth are urged further into the rubber upon resistance by the pulling of the impeller (e.g., the teeth curve upward in the orientation shown in FIG. 1B, away from the resistance force of the impeller). This configuration of the teeth does not require as steep of an angled ramp surface as a configuration of teeth that is more dull or does not include the upward curve.

The assembly 100 further includes a threaded central rod 140 coaxial with the arm rotator bolt 120 and the bearing 130, and having a tool engaging portion 142 (e.g., for a socket wrench, spanner, etc.) at a first end and an interface tip 144 at an opposite second end. During use of the assembly 100, as will be explained in greater detail below, once the teeth 112 of the first and second puller arms 110a and 110b are engaged into the flexible material of the impeller hub, the threaded central rod 140 can be rotated to press against the pump shaft to move all of the other components of the assembly 100 with respect to the pump shaft and the threaded central rod 140, imparting an axial force on the impeller with respect to the pump shaft and thereby removing the impeller from the pump shaft. In the embodiments disclosed herein, the first and second puller arms 110a and 110b are configured to rotate with respect to their corresponding first and second pins 114a and 114b at a similar rate during use to provide a centering effect of the threaded central rod 140, and resultingly aligning the interface tip 144 of the threaded central rod 140 with the shaft of the water pump.

Figure 1C:
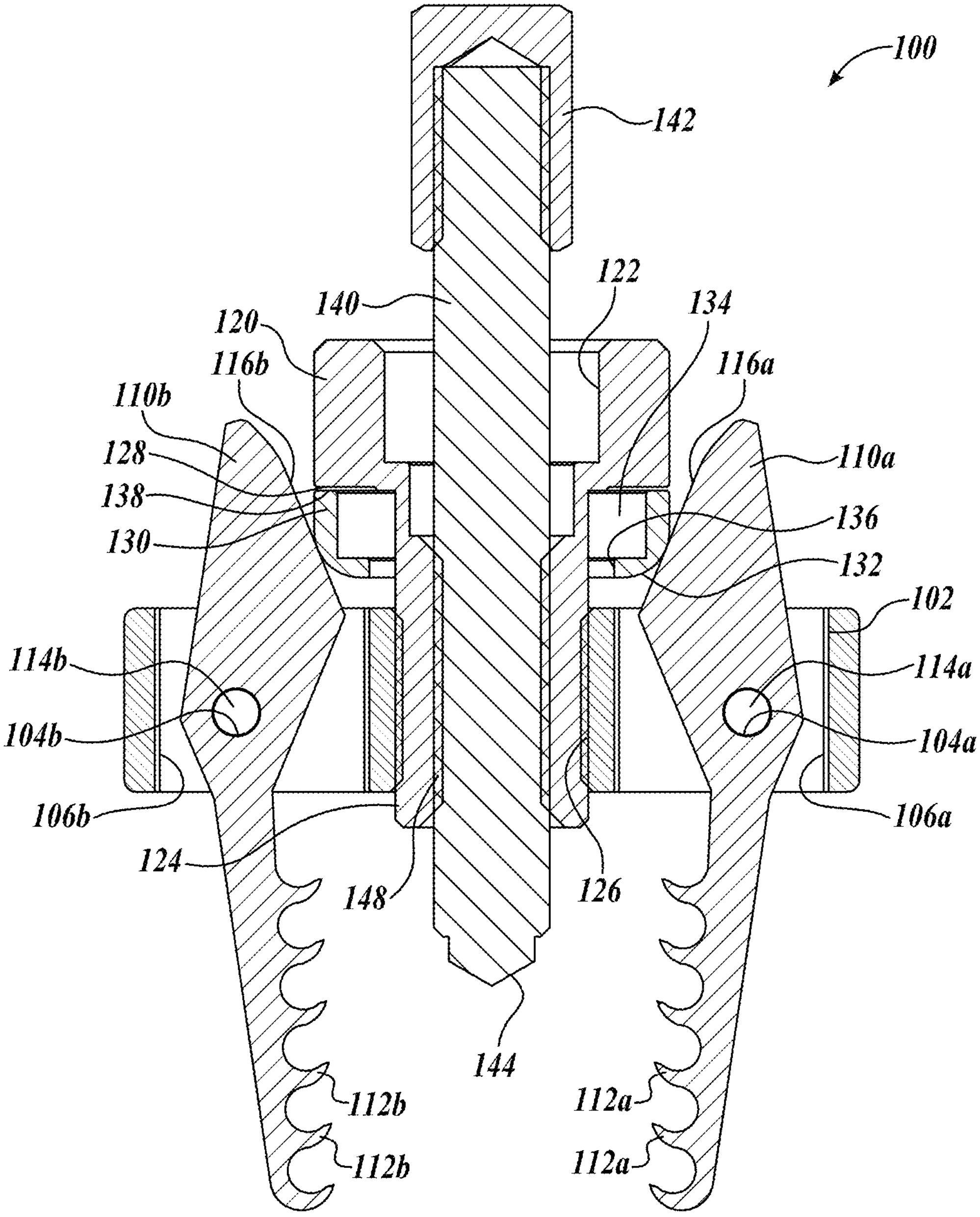
FIG. 1C is a cross-sectional view of the impeller removal tool assembly of FIG. 1B.

FIG. 1C is a cross-sectional view of the assembly 100, showing the threaded engagement of the components and the bearing surface interface. As shown, the tool engaging portion 142 of the threaded central rod 140 can be a separate component that is operably coupled (e.g., press-fit, welded, thread-locked, etc.) such that the tool engaging portion 142 does not rotate with respect to the threaded central rod 140 during use of the assembly 100. In other embodiments, the tool engaging portion 142 is integral with the threaded central rod 140. The bearing 130 can further include a central section 134 and a clearance opening 136 configured such that the threaded shank 124 of the arm rotator bolt 120 can rotate freely without engaging the bearing 130. As shown, the arm rotator bolt 120 can include a bearing interface surface 128 that abuts a bolt interface surface 138 on the bearing 130. During use of the assembly 100, the surfaces 128 and 138 can have any suitable friction reducing treatment, such as roller bearings (not shown), grease, oil, etc. The threaded shank 124 can threadably interface corresponding internal threads 126 of the central body 102 to move the arm rotator bolt 120 with respect to the central body 102. The threaded central rod 140 can threateningly interface corresponding internal threads 148 of the arm rotator bolt 120.

In an example, the assembly 100 can be used according to the following procedure. The liquid (water, coolant, etc.) is drained from the cooling system and the cover is removed from the water pump housing to expose the impeller. The first and second puller arms 110a and 110b are initially adjusted by turning the arm rotator bolt 120 with respect to the central body 102. Once the first and second puller arms 110a and 110b are open wider than the diameter of the impeller hub portion, the assembly 100 is installed on the impeller by sliding the first and second puller arms 110a and 110b down the length of impeller until the central body 102 is near the pump housing. While holding the assembly 100 in place, the arm rotator bolt 120 is tightened toward the central body 102. During the tightening, the first and second puller arms 110a and 110b rotate about their corresponding pins 114 and drive the teeth 112 inward towards the impeller hub, engaging the flexible material. In some embodiments, the inward force is expected to cause the teeth 112a and 112b to pierce into the rubber material of the impeller hub. Next, the threaded central rod 140 is rotated with respect to the central body 102 toward the pump shaft until the interface tip 144 contacts the pump shaft, where continued rotation of the threaded central rod 140 exerts a pulling force on the impeller through the teeth 112 of the arms 110, removing the impeller from the pump shaft.

Figure 2A:
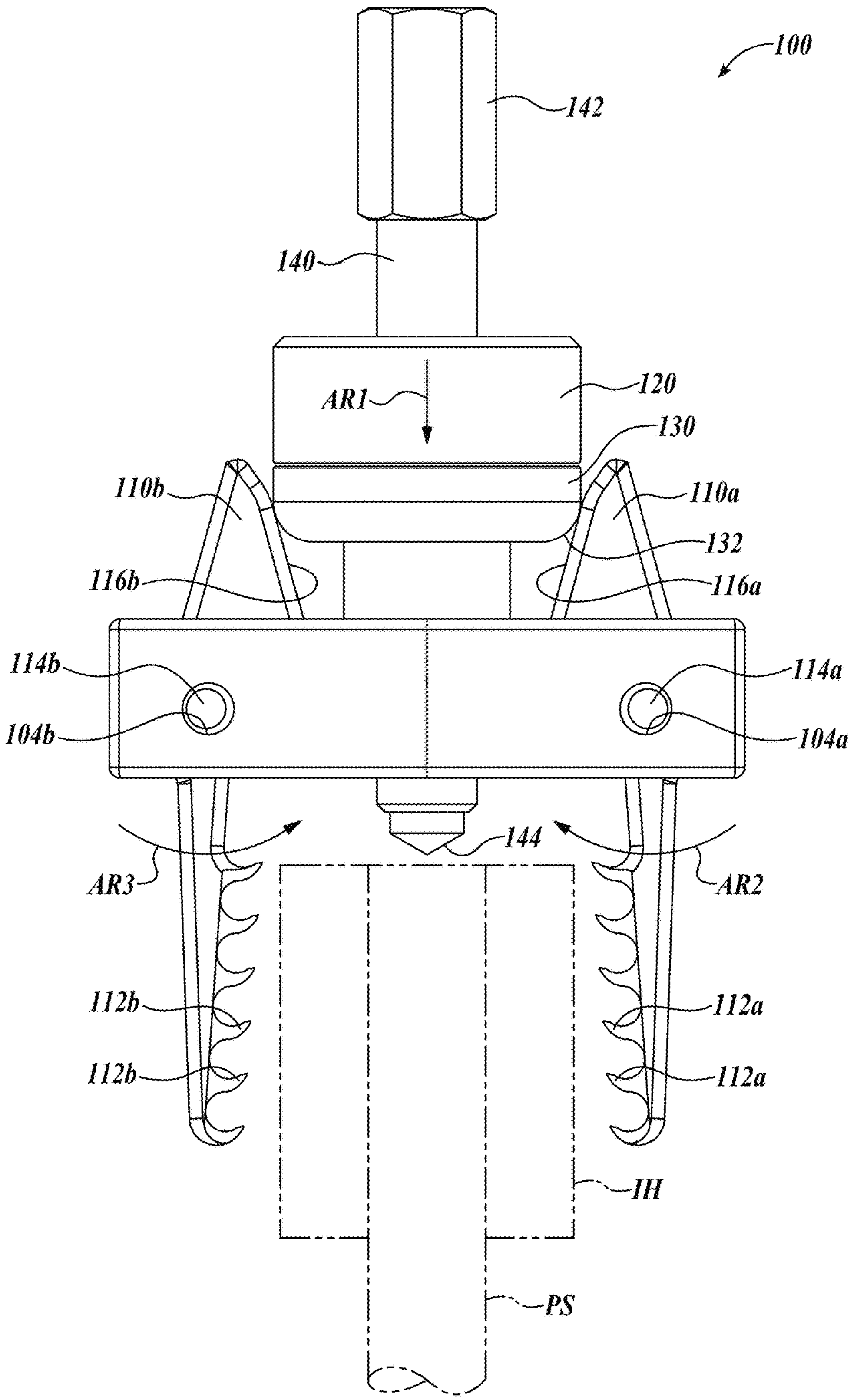
FIGS. 2A-2C are front views of the impeller removal tool assembly of FIGS. 1A and 1B, showing various stages of the impeller removal tool assembly interfacing with an impeller hub and a pump shaft.

The above procedure will be described with respect to FIGS. 2A-2C, which are front views of the assembly 100, showing various stages of the assembly 100 interfacing with an impeller hub IH and a pump shaft PS, represented by dashed lines for clarity in the FIGURES. In FIG. 2A, the first and second puller arms 110a and 110b are open wider than the diameter of the impeller hub IH, and the assembly 100 is installed on the impeller by sliding the first and second puller arms 110a and 110b down the length of impeller hub IH until the central body 102 is near the pump housing (not shown). While holding the assembly 100 stationary, the arm rotator bolt 120 is tightened such that the arm rotator bolt 120 and the bearing 130 move in the direction of arrow AR1 toward the central body 102. During the rotation of the arm rotator bolt 120, the arm interface surface 132 interfaces the first and second angled ramp surfaces 116a and 116b of the first and second puller arms 110a and 110b, causing the first and second puller arms 110a and 110b to rotate about their corresponding pins 114a and 114b in the direction of arrows AR2 (first puller arm 110a) and AR3 (second puller arm 110b), thereby driving the teeth 112a and 112b inward towards the impeller hub IH, engaging and/or piercing the flexible material.

Figure 2B:
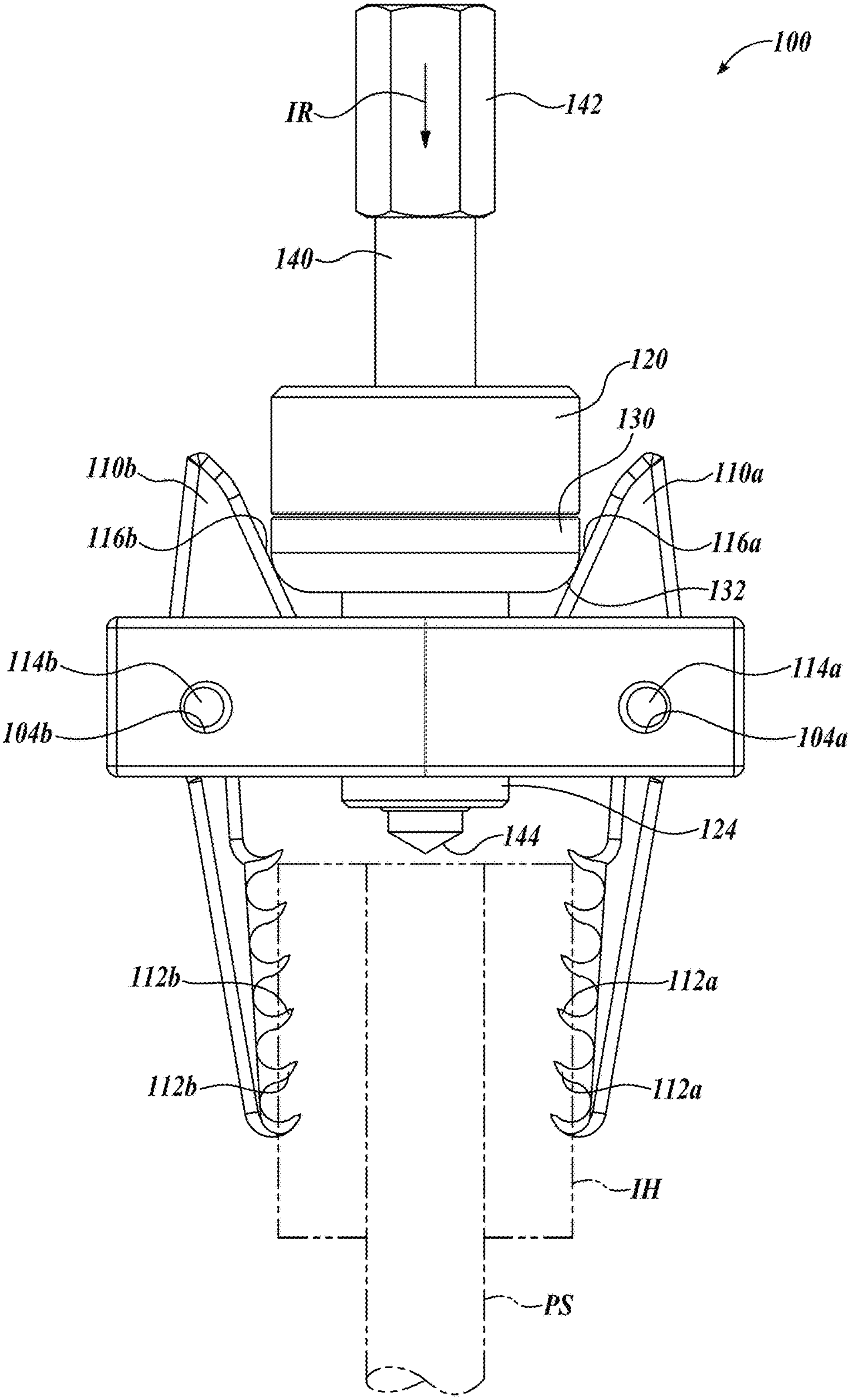
Figure 2C:
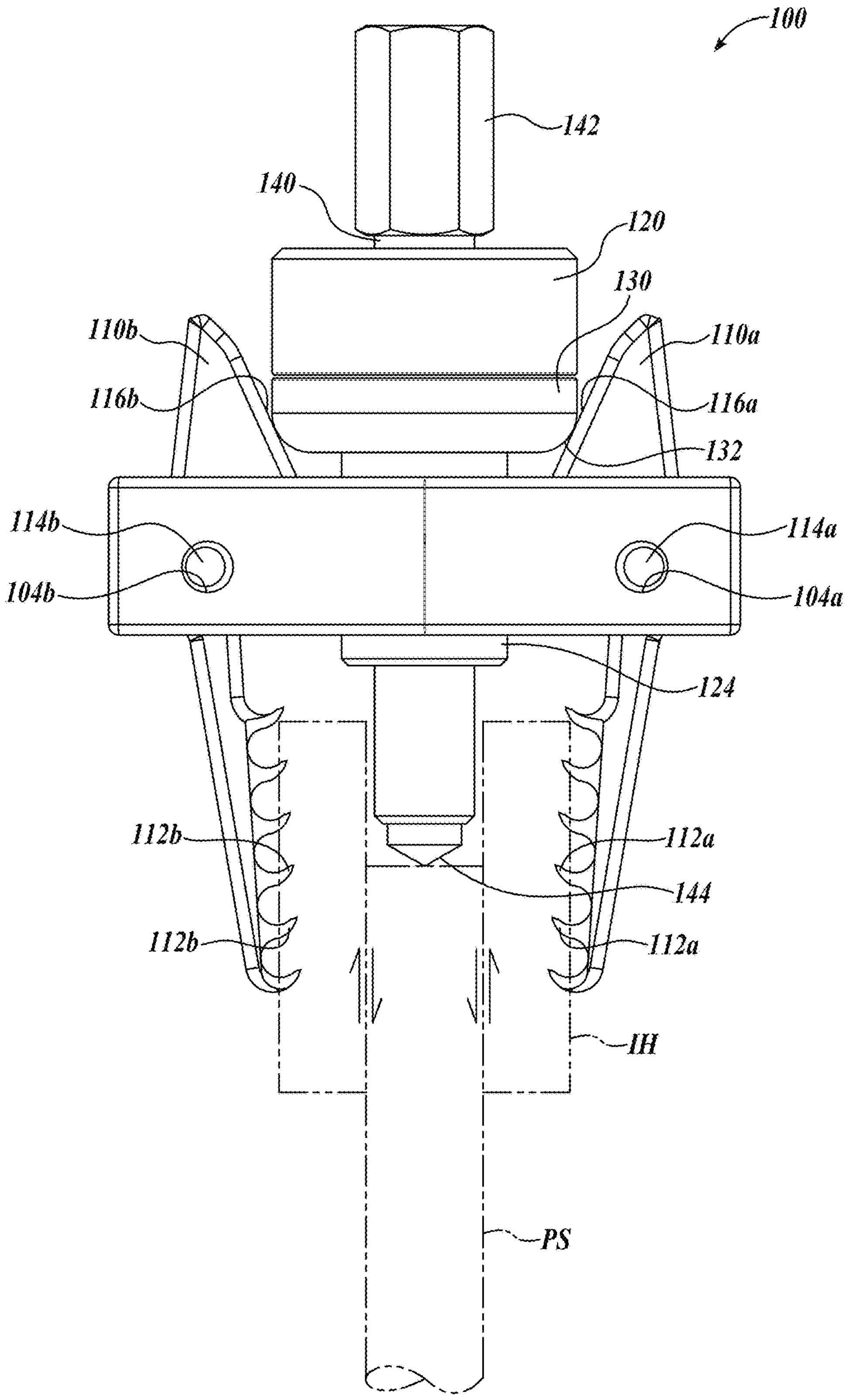

In FIG. 2B, the teeth 112a and 112b are engaged with the impeller hub IH, while holding the assembly 100 stationary, the threaded central rod 140 is rotated with respect to the central body 102 such that the threaded central rod 140 moves in the impeller removal direction of arrow IR toward the pump shaft PS until the interface tip 144 contacts the pump shaft PS. After this position, as shown next in FIG. 2C, continued rotation of the threaded central rod 140 with respect to the central body 102 exerts a pulling force on the impeller hub IH through the teeth 112 of the arms 110, sliding the impeller along the pump shaft PS (to an intermediate position shown in FIG. 2C) and subsequently removing the impeller from the pump shaft PS.

Figure 3:
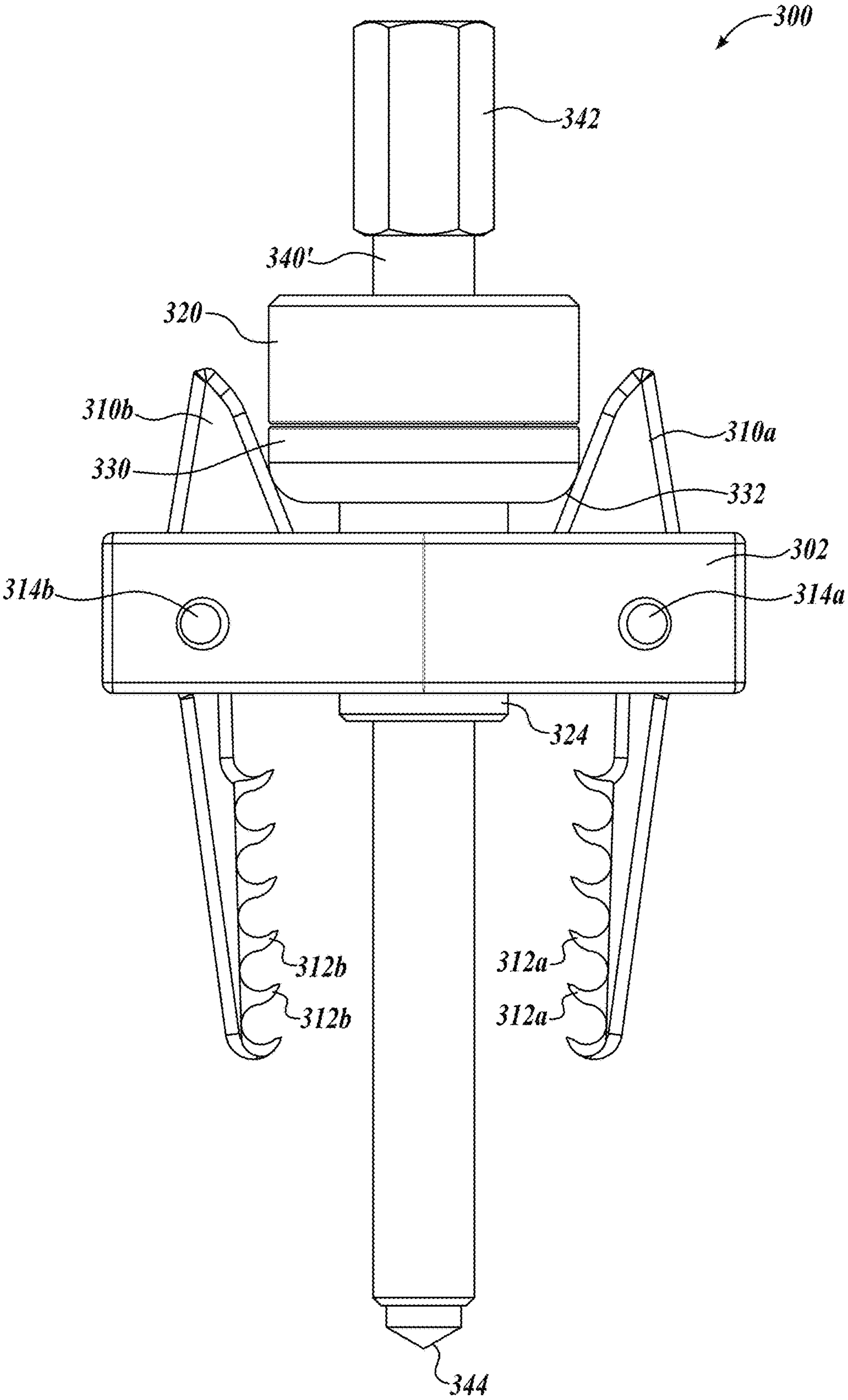
FIG. 3 is a front view of another impeller removal tool assembly, in accordance with embodiments of the present disclosure.

FIG. 3 is a front view of another embodiment of an impeller removal tool assembly 300 (hereinafter "assembly 300"), in accordance with embodiments of the present disclosure. The assembly 300 is similar in components and function to the assembly 100 and includes components in the 300-series, where like numerals in the 300-series denote like components disclosed above in the 100-series, except where distinguished by a prime symbol. For example, the reference numeral 302 in FIG. 3 refers to a central body of the assembly 300, similar to the central body 102 of the assembly 100, the reference numeral 310*a* in FIG. 3 refers to a first puller arm of the assembly 300, similar to the first puller arm 110*a* of the assembly 100, and so on for the non-prime reference numerals in FIG. 3. The assembly 300 is configured to remove impellers having a longer impeller hub and corresponding pump shaft. In this regard, the assembly 300 includes a threaded central rod 340' that is longer than the threaded central rod 140 of the assembly 100.

Figure 4:
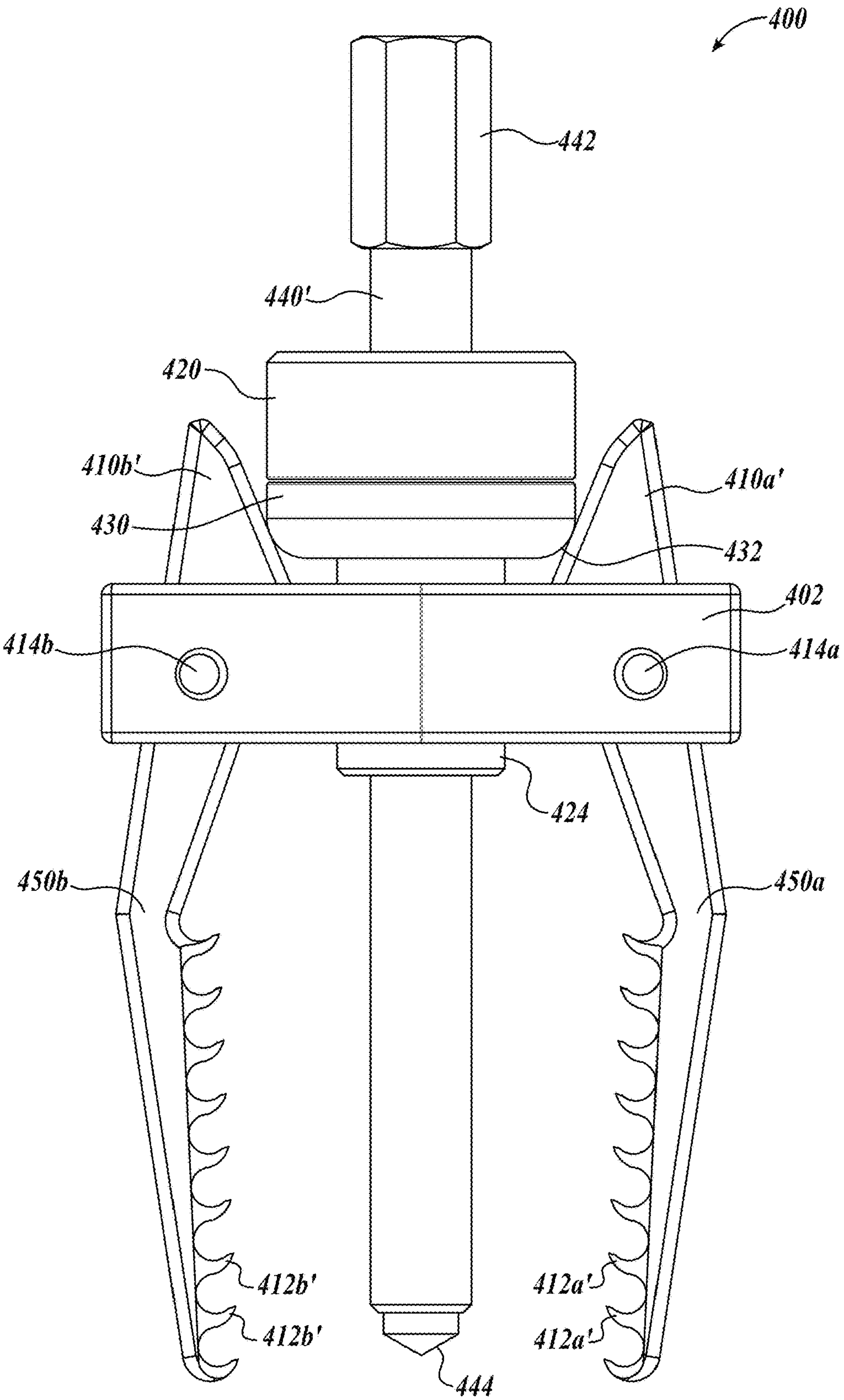
FIG. 4 is a front view of another impeller removal tool assembly, in accordance with embodiments of the present disclosure.

FIG. 4 is a front view of another embodiment of an impeller removal tool assembly 400 (hereinafter "assembly 400"), in accordance with embodiments of the present disclosure. The assembly 400 is similar in components and function to the assembly 100 and the assembly 300, and includes components in the 400-series, where like numerals in the 400-series denote like components disclosed above in the 100-series, except where distinguished by a prime symbol. For example, the reference numeral 402 refers to a central body of the assembly 400, similar to the central body 102 of the assembly 100, the reference numeral 414*a* refers to a first pin of the assembly 400, similar to the first pin 114*a* of the assembly 100, and so on for the non-prime reference numerals in FIG. 4. The assembly 400 is configured to remove impellers having a larger impeller hub diameter and a longer impeller hub and corresponding pump shaft. In this regard, the assembly 400 includes a threaded central rod 440' that is longer than the threaded central rod 140 of the assembly 100. Further, the assembly 400 includes first and second puller arms 410*a*' and 410*b*' that are longer than the first and second puller arms 110*a* and 110*b* and include intermediate angled portions 450*a* and 450*b* that orient the teeth 412*a*' and 412*b*' along the axis of the impeller hub at a wider spread position (compare FIG. 4 with FIG. 3). Other suitable configurations of the arms 110/310/410 and/or the length of the threaded central rod 140/340/440 are also within the scope of the present disclosure.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone, or "A and B." Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The invention claimed is:

1. An impeller removal tool assembly, comprising:

a central body having an aperture defining an axis;

a first puller arm pivotably pinned to the central body and having:

a first angled ramp surface above the central body facing the axis; and a plurality of first teeth below the central body projecting toward the axis;

a second puller arm pivotably pinned to the central body mirrored across the axis from the first puller arm, the second puller arm having:

a second angled ramp surface above the central body facing the axis; and a plurality of second teeth below the central body projecting toward the axis;

an arm rotator bolt threadably engaged with the aperture of the central body and coaxially aligned with the axis and a bearing coaxially aligned with the axis and positioned between the arm rotator bolt and the first and second angled ramp surfaces, wherein rotation of the arm rotator bolt translates the arm rotator bolt and the bearing along the axis with respect to the central body, wherein the bearing is configured to contact the first and second angled ramp surfaces during translation of the arm rotator bolt thereby causing the first and second puller arms to rotate between a first position in which the pluralities of first and second teeth are configured to be disengaged from a hub of an impeller, and a second position in which the pluralities of first and second teeth are configured to engage the hub of the impeller; and a central rod threadably engaged with and extending through the arm rotator bolt, the central rod being coaxially aligned with the axis, wherein rotation of the central rod translates the central rod along the axis with respect to the central body, the arm rotator bolt, and the bearing, and wherein the central rod is configured to interface with a pump shaft when the first and second puller arms are in the second position.

2. The impeller removal tool assembly of claim 1, wherein the bearing is configured to be rotationally static with respect to the first and second angled ramp surfaces during rotation of the arm rotator bolt.

3. The impeller removal tool assembly of claim 1, wherein the bearing comprises a rounded arm interface surface configured to contact the first and second angled ramp surfaces.

4. The impeller removal tool assembly of claim 1, wherein the central rod has a tool engaging portion configured to receive a tool capable of imparting a torque on the central rod.

5. The impeller removal tool assembly of claim 4, wherein the central rod has an interface tip positioned at an end opposite the tool engaging portion for interfacing with the pump shaft.

6. The impeller removal tool assembly of claim 1, wherein the first and second angled ramp surfaces have a compound angle.

7. The impeller removal tool assembly of claim 1, wherein the pluralities of first and second teeth have an upward profile configured to pierce the hub of the impeller and urge the first and second puller arms toward each other during removal of the impeller.

8. The impeller removal tool assembly of claim 1, wherein the arm rotator bolt further comprises a bowl portion configured to provide clearance for a tool rotating the central rod by the tool engaging portion.

9. The impeller removal tool assembly of claim 1, wherein the first and second puller arms each comprise first and second intermediate angled portions, respectively, to change the position of the pluralities of first and second teeth with respect to the first and second angled ramp surfaces.

* * * * *